United States Patent [19]

Linkous

[11] Patent Number: 5,271,813
[45] Date of Patent: Dec. 21, 1993

[54] APPARATUS AND METHOD FOR THE ELECTROLYSIS OF WATER EMPLOYING A SULFONATED SOLID POLYMER ELECTROLYTE

[75] Inventor: Clovis A. Linkous, Merritt Island, Fla.

[73] Assignee: University of Central Florida, Orlando, Fla.

[21] Appl. No.: 38,887

[22] Filed: Mar. 29, 1993

[51] Int. Cl.⁵ .............................. C25B 1/06; C25B 1/10; C25B 9/00; C25B 13/08
[52] U.S. Cl. ..................................... 204/129; 204/262; 204/266; 204/296; 204/282
[58] Field of Search .................. 204/263–266, 204/283, 296, 129, 262, 282

[56] References Cited

U.S. PATENT DOCUMENTS

| | | | |
|---|---|---|---|
| 3,870,616 | 3/1975 | Dempsey et al. | 204/266 X |
| 4,707,228 | 11/1987 | Rubak | 204/129 X |
| 4,950,371 | 8/1990 | McElroy | 204/266 X |
| 4,978,438 | 12/1990 | Shimamune et al. | 204/295 X |
| 5,203,972 | 4/1993 | Shimamune et al. | 204/129 |

Primary Examiner—Donald R. Valentine
Attorney, Agent, or Firm—James H. Beusse

[57] ABSTRACT

An electrolyzer is provided for electrolyzing water into its constituent elements, namely oxygen and hydrogen gas. The electrolyzer includes a vessel in which a sulfonated solid polymer electrolyte is situated. The sulfonated solid polymer electrolyte is selected from a group including sulfonated polyetheretherketone (SPEEK), sulfonated polyethersulfone (SPES), sulfonated polybenzimidazole (SPBI), sulfonated polyphenylquinoxaline (SPPQ) and sulfonated fluorinated polyimide (SFPI). The electrolyzer also includes anode and cathode electrodes situated on the electrolyte. A direct current (DC) power supply is coupled to said anode and cathode electrodes to drive the reaction. A heater heats the electrolyte and a water supply is connected to one of said cathode and anode electrodes. The resultant oxygen and hydrogen are collected at the respective electrodes. The solid polymer electrolyte desirably operates with relatively high ionic conductivity at high temperatures without loss of structural integrity. In this manner, a high rate of gas output is achieved with substantially lower drive voltage and energy consumption.

3 Claims, 2 Drawing Sheets

APPARATUS AND METHOD FOR THE ELECTROLYSIS OF WATER EMPLOYING A SULFONATED SOLID POLYMER ELECTROLYTE

BACKGROUND OF THE INVENTION

This invention relates in general to electrolysis and, more particularly, to the electrolysis of water into its constituent elements.

It is often desirable to decompose water into its chemical elements, namely hydrogen ($H_2$) and oxygen ($O_2$). Electrolysis is the chemical reaction typically employed to achieve this end. In a simple water electrolyzer, water is confined in a vessel in which a positive and negative electrode are situated. A direct current (DC) power supply is then coupled to the positive and negative electrodes. When the DC power supply is adjusted to a sufficiently high voltage, the water molecules break down and $H_2$ gas is generated at the cathode while $O_2$ gas is generated at the anode. In actual practice, the water in the vessel is a solution referred to as an electrolyte, for example a salt solution, which enables ionic conductivity between the electrodes. In the above described example, a liquid electrolyte is employed. Alkaline systems employing liquid electrolytes such as KOH and NaOH solutions are well known. These systems generally operate at relatively high temperatures such as 80 degrees C., for example.

Those skilled in the art are also familiar with the use of solid electrolytes in electrolyzers. For example, solid polymer electrolytes such as polystyrene sulfonates have been used and more stable perfluoroalkane sulfonate ionomers such as the Nafion ionomer (Nafion is a trademark of DuPont) have also been used.

In these days of energy conservation and great concern for efficiency, it is of course desirable that the maximum amount of $H_2$ and $O_2$ end products be obtained for a given power level applied to the electrolyzer. It is known that increasing the temperature at which electrolysis is conducted also increases the ionic conductivity across the solid polymer electrolyte membrane. Thus, the higher the temperature at which the electrolysis reaction is conducted, the lower are the drive voltage and drive power requirements for a given amount of $H_2$ and $O_2$ gas products.

Unfortunately, many solid polymer electrolytes exhibit relatively low conductivity at relatively low temperatures such as between approximately 20 through 70 degrees C. However, when many of such solid polymer electrolytes, such as Nafion for example, are subjected to higher temperatures such as 150 degrees C. and above to increase their ionic conductivity in an electrolytic reaction, their structural integrity comes into question. At high temperatures the glass transition temperature of many solid polymer electrolytes is approached and passed. In this case, the solid polymer electrolyte may begin to soften and flow thereby becoming structurally unstable. The solid polymer electrolyte may also break down into fragments and release undesired gaseous decomposition products.

SUMMARY OF THE INVENTION

Accordingly, one object of the present invention is to provide an electrolytic system employing a solid polymer electrolyte and which is capable of operating at relatively high temperatures without losing structural integrity.

Another object of the present invention is to provide an electrolytic system employing a solid polymer electrolyte and which exhibits a relatively high ionic conductivity.

Yet another object of the present invention is to provide an electrolytic system employing a solid polymer electrolyte and which is efficient in terms of power or energy required to produce a given amount of $H_2$ and $O_2$ products.

In accordance with one embodiment of the present invention, an electrolyzer apparatus is provided which includes a vessel. A sulfonated solid polymer electrolyte is situated in the vessel. The electrolyte is selected from a group of electrolytes including sulfonated polyetheretherketone (SPEEK), sulfonated polyethersulfone (SPES), sulfonated polybenzimidazole (SPBI), sulfonated polyphenylquinoxaline (SPPQ) and sulfonated fluorinated polyimide (SFPI). An anode electrode and a cathode electrode are situated on the electrolyte. A direct current (DC) power supply is coupled to the anode and cathode electrodes. A supply of water is connected to one of the cathode and anode electrodes. The electrolyzer also includes a heater for heating the electrolyte to a temperature in the range of approximately 100 degrees C. to approximately 200 C. A collector is situated at the anode to collect oxygen gas therefrom. Another collector, if desired, is situated at the cathode to collect hydrogen gas therefrom.

BRIEF DESCRIPTION OF THE DRAWINGS

The features of the invention believed to be novel are specifically set forth in the appended claims. However, the invention itself, both as to its structure and method of operation, may best be understood by referring to the following description and accompanying drawings.

DETAILED DESCRIPTION OF THE INVENTION

Figure 1:
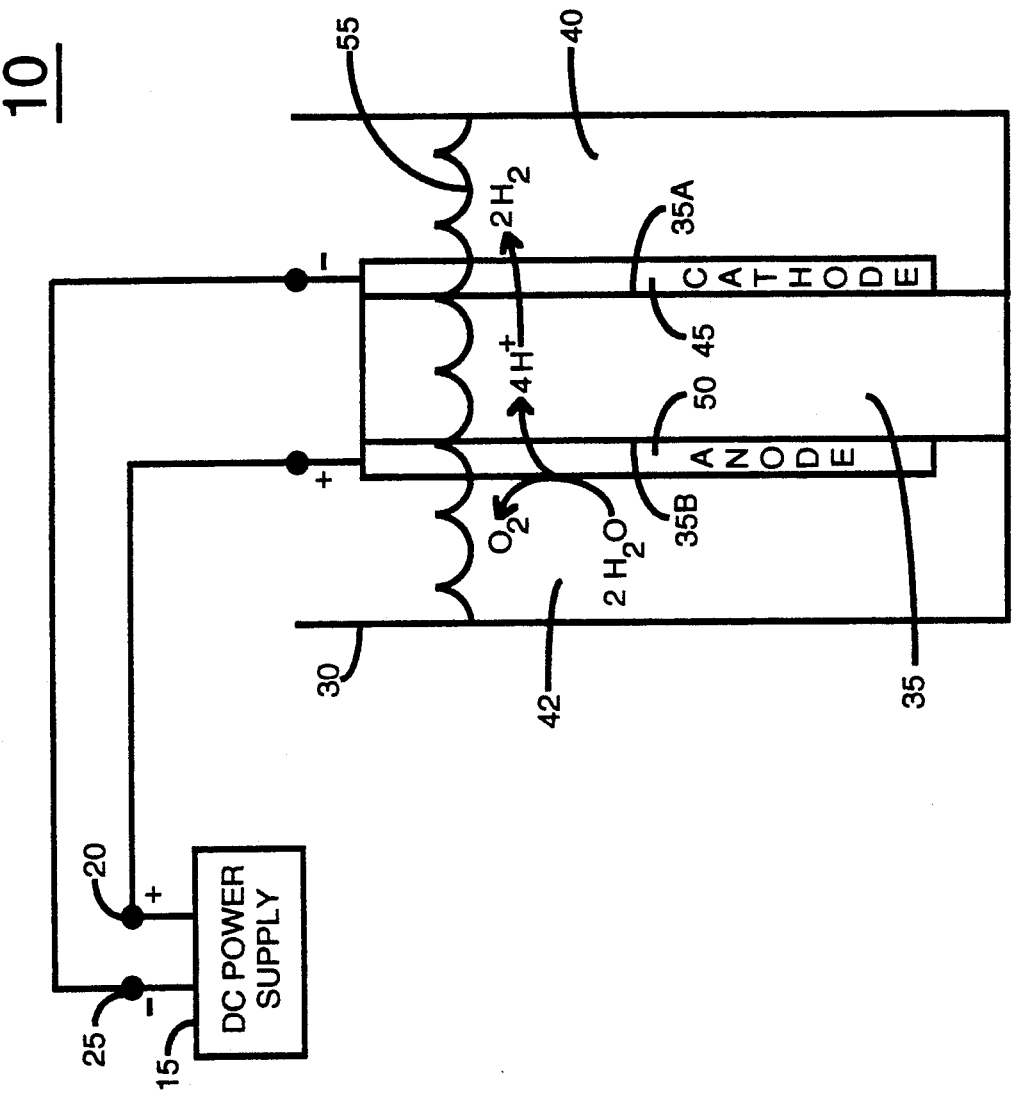
FIG. 1 is a simplified representation of an electrolyzer system in accordance with the present invention.

FIG. 1 shows a simplified representation of an electrolytic system for decomposing water into its constituent elements. More specifically, FIG. 1 shows an electrolyzer 10 which includes a direct current power supply 15 for supplying a positive voltage to terminal 20 and a negative voltage to terminal 25.

Electrolyzer 10 also includes a vessel 30 capable of holding liquid without leaking. A solid polymer electrolyte 35 is situated within vessel 30 as shown. Electrolyte 35 exhibits a planar geometry including opposed major surfaces 35A and 35B in this embodiment. It will be appreciated that other geometries such as cylindrical and spiral, for example, can also be employed for electrolyte 35. In actual practice, electrolyte 35 is a thin membrane which is centrally situated in vessel 30 so as to separate vessel 30 into a cathode compartment 40 and an anode compartment 42. Electrolyte 35 forms a seal between cathode compartment 40 and anode compartment 42.

A cathode electrode 45 is situated on electrolyte surface 35A in cathode compartment 40. An anode electrode 50 is situated on electrolyte surface 35B in anode compartment 40. Cathode and anode electrodes 45 and 50 are preferably fabricated from metal such as porous carbon-supported platinum, for example. Cathode 45 is coupled to negative terminal 25 of DC power supply 15 and anode 50 is coupled to positive terminal 20. Vessel 30 is supplied with water 55 to provide solid polymer electrolyte 35 with a source of water 55 for use during the electrolytic reaction.

Electrolyzer 10 employs a very special type of solid polymer electrolyte which contributes to the unique properties, features and capabilities of the this electrolyzer. More specifically, in a preferred embodiment of the invention, solid polymer electrolyte 35 is fabricated from sulfonated polyetheretherketone (abbreviated SPEEK, for convenience). Polyetheretheketone (PEEK) is a polymer which exhibits desirable high temperature properties. However, its ionic conductivity is insufficient to permit its use as a satisfactory electrolyte. It has been found that sulfonated polyetheretherketone (SPEEK), however, exhibits a sufficiently high ionic conductivity for use as a solid electrolyte in the present electrolyzer while still maintaining the structural integrity of the electrolyte at high temperatures such as those temperatures above approximately 80 degrees C., for example. One technique which may be employed to sulphonate PEEK to produce SPEEK is described in the article "The Sodium Salts Of Sulfonated Poly(aryl-ether-ether-ketone) (PEEK); Preparation And Characterization" by Christian Bailly, David J. Williams, Frank E. Karasz and William J. MacKnight, in Polymer, May 1987, Vol. 28, pp. 1009–1016.

Other sulfonated solid polymer electrolytes may be employed as solid polymer electrolyte 35 as well. For example, sulfonated polyethersulfone (SPES), sulfonated polybenzimidazole (SPBI), sulfonated polyphenylquinoxaline (SPPQ) and sulfonated fluorinated polyimide (SFPI) may also be employed as a solid polymer electrolyte.

A mass flow diagram of the subject electrolytic reaction is integrated into FIG. 1 and shows 2 $H_2O$ molecules at anode 50 being decomposed into an $O_2$ gas molecule and 4 protons ($H^+$). The 4 protons ($H^+$) migrate across solid polymer electrolyte 35 and exit cathode 45 as $2H_2$, a gas.

Figure 2:
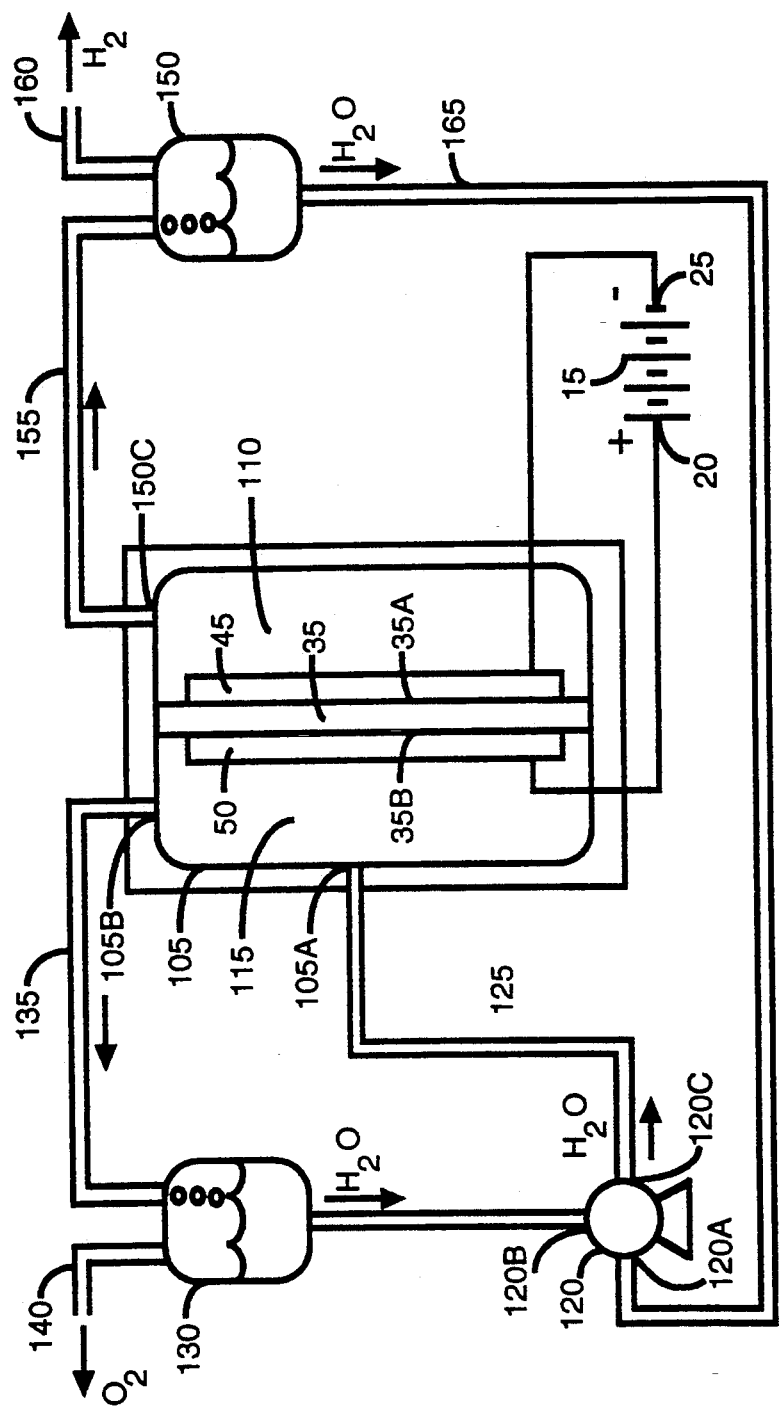
FIG. 2 is a more detailed block diagram of the electrolyzer system of the present invention showing a cross sectional view of the electrolyzer vessel portion thereof.

When operation of the electrolytic system of the invention is desired at temperatures above 100 degrees C., the system must be pressurized such as shown in the embodiment depicted in FIG. 2 as electrolyzer 100. Electrolyzer 100 includes many elements in common with electrolyzer 10 of FIG. 1. Like numerals indicate like elements in FIG.'s 1 and 2.

Electrolyzer 100 includes a sealed containment vessel 105. Vessel 105 is sealed from the outside environment except for openings 105A, 105B and 105C. Solid polymer electrolyte 35 divides vessel 105 into a cathode compartment 110 and an anode compartment 115 which are sealed from each other by electrolyte 35.

A pump 120, which includes input ports 120A and 120B and an output port 120C, supplies water to vessel 105. More particularly, pump output port 120C is connected by a water feed pipe 125 to opening 105A to supply water to vessel 105. Opening 105B is connected to a bubbler 130 by a pipe 135 to exhaust oxygen from vessel 105 to bubbler 130. An oxygen output pipe 140 is connected to bubbler 130 as shown. A water drain pipe 145 is connected between bubbler 130 and pump input port 120B to drain condensed water back into the system.

Opening 105C is connected to a bubbler 150 by a pipe 155 to exhaust hydrogen from vessel 105 to bubbler 150. An hydrogen output pipe 160 is connected to bubbler 150 as shown. A water drain pipe 165 is connected between bubbler 150 and pump input port 120A to drain condensed water back into the system.

A heater 170 surrounds vessel 105 as shown and heats vessel 105 to a temperature within the range of approximately 80 degrees C. to approximately 200 degrees C. Best performance of the electrolyzer is observed between a temperature within the range of approximately 100 degrees C. to approximately 200 degrees C. At high operating currents, the heater need only consist of an insulative covering since at high currents sufficient heat is generated by the electrolytic process itself to sustain the electrolytic reaction.

The present invention desirably requires only a relatively low drive voltage from DC voltage source 15. For example, the drive voltage provided by source 15 may be as low as within the range of approximately 1.5 volts to approximately 2.5 volts to successfully drive the electrolytic reaction in this embodiment of the invention.

While the above description sets forth an electrolyzer for decomposing water into its constituent elements, it is clear that a method for the electrolysis of water is also disclosed. More particularly, a method for the electrolysis of water is disclosed which includes the step of providing a vessel in which electrolysis is to be conducted. The method also includes the step of providing a solid polymer electrolyte in the vessel, the electrolyte being selected from a group consisting of sulfonated polyetheretherketone (SPEEK), sulfonated polyethersulfone (SPES), sulfonated polybenzimidazole (SPBI), sulfonated polyphenylquinoxaline (SPPQ) and sulfonated fluorinated polyimide (SFPI). The method further includes the steps of providing anode and cathode electrodes to the electrolyte and providing a supply of water to one of the cathode and anode electrodes. The method includes supplying a source of DC current to the anode and cathode electrodes; The method includes the step of heating the electrolyte to a temperature in the range of approximately 100 degrees C. to approximately degrees C., and collecting $O_2$ and $H_2$ gasses from the electrodes.

The foregoing has described an electrolyzer apparatus for the decomposition of water into its constituent elements. More specifically, an electrolyzer has been provided which employs a solid polymer electrolyte that is capable of operating at relatively high temperatures without losing structural integrity. The solid polymer electrolyte in the electrolyzer exhibits a relatively high ionic conductivity. The electrolyzer exhibits significantly improved efficiency in terms of power or energy required to produce a given amount of $H_2$ and $O_2$ products.

While only certain preferred features of the invention have been shown by way of illustration, many modifications and changes will occur to those skilled in the art. It is, therefore, to be understood that the present claims are intended to cover all such modifications and changes which fall within the true spirit of the invention.

What is claimed is:

1. An electrolyzer apparatus comprising:
    a vessel,
    a sulfonated solid polymer electrolyte situated in said vessel, said electrolyte being selected from a group consisting of sulfonated polyetheretherketone (SPEEK), sulfonated polyethersulfone (SPES), sulfonated polybenzimidazole (SPBI), sulfonated polyphenylquinoxaline (SPPQ) and sulfonated fluorinated polyimide (SFPI);

an anode electrode situated on said electrolyte;

a cathode electrode situated on said electrolyte;

a direct current (DC) power supply coupled to said anode and cathode electrodes;

a supply of water for supplying water to one of said cathode and anode electrodes;

a heater for heating said electrolyte to a temperature in the range of approximately 80 degrees C. to approximately 200 degrees C., and collecting means for collecting $O_2$ and $H_2$ gasses from said electrodes.

2. A method of electrolysis of water comprising the steps of:

providing a vessel in which electrolysis is to be conducted;

providing a solid polymer electrolyte in said vessel, said electrolyte being selected from a group consisting of sulfonated polyetheretherketone (SPEEK), sulfonated polyethersulfone (SPES), sulfonated polybenzimidazole (SPBI), sulfonated polyphenylquinoxaline (SPPQ) and sulfonated fluorinated polyimide (SFPI);

providing anode and cathode electrodes to said electrolyte;

providing a supply of water to said anode electrode;

supplying a source of DC current to said anode and cathode electrodes;

heating the electrolyte to a temperature in the range of approximately 100 degrees C. to approximately 200 degrees C., and collecting $O_2$ and $H_2$ gasses from said electrodes.

3. The method of claim 2 wherein in said supplying step, a voltage is applied to said anode and cathode electrodes within the range approximately 1.5 volts to approximately 2.5 volts.

* * * * *